United States Patent [19]

Mulvanny et al.

[11] 4,399,459
[45] Aug. 16, 1983

[54] FLEXIBLE VIDEO SYNCHRONIZATION CIRCUIT

[75] Inventors: Patrick Mulvanny, Evanston; Scott Bartky, Chicago, both of Ill.

[73] Assignee: Nicolet Instrument Corporation, Madison, Wis.

[21] Appl. No.: 316,736

[22] Filed: Oct. 30, 1981

[51] Int. Cl.³ .............................................. H04N 5/06
[52] U.S. Cl. ................................................... 358/150
[58] Field of Search ............................... 358/150, 152

[56] References Cited

U.S. PATENT DOCUMENTS

| | | | |
|---|---|---|---|
| 3,574,450 | 4/1971 | White et al. | 351/17 |
| 3,588,351 | 6/1971 | Baun | 358/150 |
| 3,705,003 | 12/1972 | Lynn et al. | 351/17 |
| 3,737,217 | 6/1973 | Haines et al. | 351/23 |
| 3,861,790 | 1/1975 | Tamura | 351/17 |
| 3,910,690 | 10/1975 | Regan | 351/31 |
| 3,936,162 | 2/1976 | Krakau et al. | 351/17 |
| 4,012,128 | 3/1977 | Regan | 351/17 |
| 4,070,102 | 1/1978 | Lelouch | 351/17 |
| 4,155,632 | 5/1979 | Wolbarsht | 351/36 |

OTHER PUBLICATIONS

National Semiconductor Data Sheet for IC No. MM5230 TV Camera sync generator.
RCA transistor, Thyristor and Diode Manual, ©1971 RCA, Co., 175–179.
RCA Integrated Circuits, ©1976 RCA Co., 465–469.

Primary Examiner—Richard Murray
Attorney, Agent, or Firm—Kinney, Lange, Braddock, Westman & Fairbairn

[57] ABSTRACT

A circuit which accepts a variable horizontal frequency input signal and an independent variable vertical frequency input signal and generates a combined video synchronization signal including horizontal synchronization pulses and serrated vertical synchronization pulses preceded and followed by equalization pulses in accordance with specifications established by the National Television Standards Committee. The circuit is useful for generating a combined video synchronization signal from the variable frequency horizontal and vertical synchronization pulses supplied by programmable cathode ray tube controller integrated circuits.

9 Claims, 4 Drawing Figures

FLEXIBLE VIDEO SYNCHRONIZATION CIRCUIT

BACKGROUND OF THE INVENTION

1. Field of the Invention

This invention relates to circuits for generating television (TV) synchronization signals, including horizontal line and vertical frame synchronization. More particularly, the invention relates to circuits for generating video synchronization signals compatible with National Television Standards Committee (NTSC) standards requiring that six equalizing pulses precede and follow a vertical synchronization pulse broken by serrations into six pulses. Specifically, the invention relates to a circuit for accepting a horizonal frequency input signal and a vertical frequency input signal, both of which frequencies may be variable over a wide range, and generating a composite video synchronization signal complying with the NTSC standards.

2. Description of the Prior Art

Integrated circuits (ICs) are now available for accepting a fixed master reference frequency and generating a NTSC synchronization signal having fixed horizontal and vertical frequencies. National Semiconductor, for example, manufactures a TV camera sync generator IC, part No. MM 5320, which is a p-channel enhancement-mode MOS device accepting a master clock of 2.04545 MHZ or 1.260 MHZ, depending on the logic state applied to an input pin.

ICs are also available that interface to a microprocessor address bus and may be programmed to generate independent horizontal and vertical synchronization signals of various frequencies. Motorola, for example, manufactures a cathode ray tube (CRT) controller (CRTC) IC, part No. MC 6845, that is compatible with its MC 6800 line of microprocessor ICs.

Although CRTCs typically allow designers to program a wide range of horizontal and vertical synchronization rates, the signals generated by the CRTC are not compatible with the NTSC specifications for serrations and equalization pulses during the vertical interval. This leaves designers with a difficult choice. On the one hand, they may ignore the NTSC standards and rely on the CRTC output alone for video synchronization signals. This choice places constraints on the type of monitor that may be synchronized to the CRTC signals. Picture quality is especially important in such fields as psychological and vision testing where the attributes to be tested, such as patient's ability to discriminate large areas of low contrast, must be precisely measured independent of variations in quality of the CRT image generated by the test instrument. On the other hand, circuit designers may generate NTSC standard signals without using a CRTC. This choice eliminates the flexibility of the CRTC, since prior art circuitry is capable of providing proper serrations and equalization pulses only at fixed horizontal and vertical rates. Flexibility is useful in selecting the highest horizontal rate that a given CRT monitor may handle, in order to maximize picture resolution. Flexibility is also needed in the field of psychological and vision testing since it is desirable to test a subject's responses to a wide range of visual stimuli, including variations in vertical frame rates and number of horizontal lines per degree of viewing angle, and horizontal lines and vertical bars of various width and spatial frequency.

SUMMARY OF THE INVENTION

The general aim of the invention is to provide a circuit for generating a NTSC standard video synchronization signal from the variable horizontal and vertical frequencies generated by an IC CRTC, thereby providing programmable flexibility of the CRTC while maintaining NTSC standardization and compatibility with commercial CRT monitors.

It is an object of the invention to provide a means for synchronizing inexpensive TV monitors to increased horizontal frequencies for increased resolution.

Another object of the invention is to provide means for synchronizing inexpensive CRT monitors to a computer for generating high-density computer graphics displays.

Still another object of the invention is to permit variation of the vertical frequency independent of the variation in horizontal frequency.

Yet another objective is to generate high spatial-waveform fidelity displays on inexpensive CRT monitors for use with pyschological and vision testing.

In accordance with the present invention, a circuit is provided accepting the horizontal frequency and vertical frequency signals generated by a CRTC and deriving a corresponding NTSC video synchronization signal at an output node. A digital phase-locked loop (PLL) containing a divide-by-fourteen digital divider provides four phases locked in phase to the horizontal frequency and a signal at fourteen times the horizontal frequency. The digital divider includes a synchronous counter and a decoder. The counter is synchronously reset to zero when counting past state 13. The decoder provides the reset pulse as well as the multiple phases at the horizontal frequency.

The leading edge of the vertical frequency signal from the CRTC sets a D flip-flop, the output of which is shifted into a shift-register delay line clocked at twice the horizontal frequency by two opposing phases of the digital divider, one of which is also used to provide NTSC horizontal sync pulses. These two phases are also gated by the PLL signal at fourteen times the horizontal frequency to provide narrow NTSC equalization pulses. The output of the sixth stage in the shift register is fed back to reset the D flip-flop, thereby regenerating a vertical sync pulse in phase synchronism with the horizontal frequency and three horizontal periods wide. The first and thirteenth register outputs provide early and late revisions of the vertical sync pulse in order to enable the equalization pulses to reach the output node. The seventh stage in the shift register generates the current vertical sync pulse fed to the output node after serration by two opposing phases of the digital divider that immediately precede the phases that clock the shift register. The horizontal sync pulses are disabled from reaching the output node whenever the early, current, or late versions of the vertical sync pulses are present. Thus an NTSC video synchronization signal reaches the output having either horizontal sync pulses, equalization pulses, or serrated vertical sync pulses.

Figure 1:
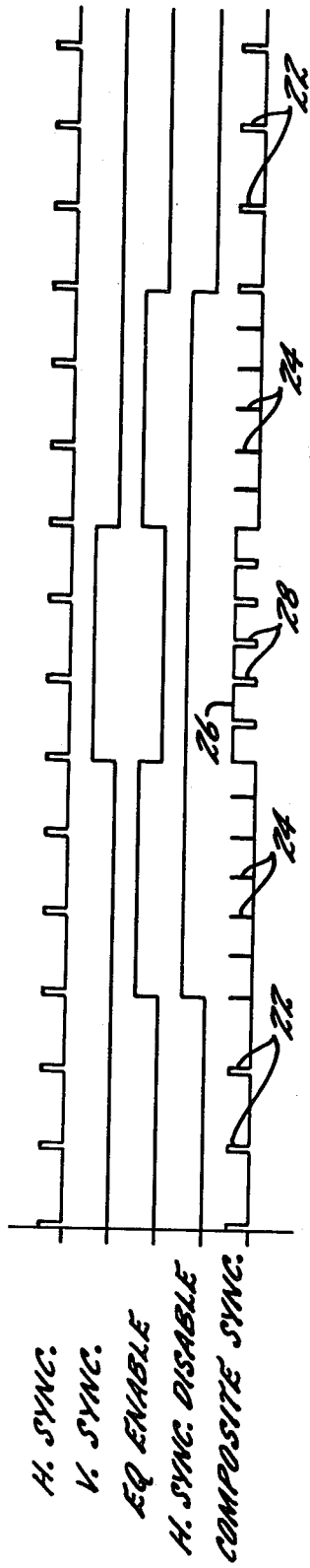
FIG. 1 is a timing diagram illustrating the video synchronization signal specified by the NTSC.

While the invention is susceptible of various modifications and alternative constructions, a certain preferred embodiment has been shown in the drawings and will be described below in considerable detail. It should be understood, however, that there is no intention to limit the invention to the specific form described but, on the contrary, the intention is to cover all modifications, alternative constructions and equivalents falling within the scope of the appended claims.

DESCRIPTION OF THE PREFERRED EMBODIMENT

Turning now to the drawings, FIG. 1 illustrates the various parts of the video synchronization, or "sync" signal designated (COMPOSITE SYNC), specified by the NTSC. During most of the time when the video sync signal (COMPOSITE SYNC) is comprised of horizontal sync pulses (22) but for nine periods of the horizontal frequency the video sync signal (COMPOSITE SYNC) contains vertical sync information. A serrated vertical sync pulse (26) of three horizontal periods duration is broken into six pulses by serrations (28) at twice the horizontal frequency. Moreover, the serrated vertical sync pulse (26) is preceded and followed by 6 narrow equalizing pulses (24). The equalizing pulses (24) are at tiwce the horizontal frequency and are half the width as the horizontal sync pulses (22) and serrations (28).

According to the present invention, the video sync signal (COMPOSITE SYNC) is obtained by logically combining its constituent parts including a steady stream of horizontal sync pulses (H. SYNC) and vertical sync pulses (V. SYNC). The horizontal sync pulses (22) are disabled for nine horizontal periods by a gating signal (H. SYNC DISABLE). Equalizing pulses (24) are enabled for three horizontal periods preceding and following the vertical sync pulses (26), (V. SYNC) by a gating signal (EQ ENABLE).

Figure 2:
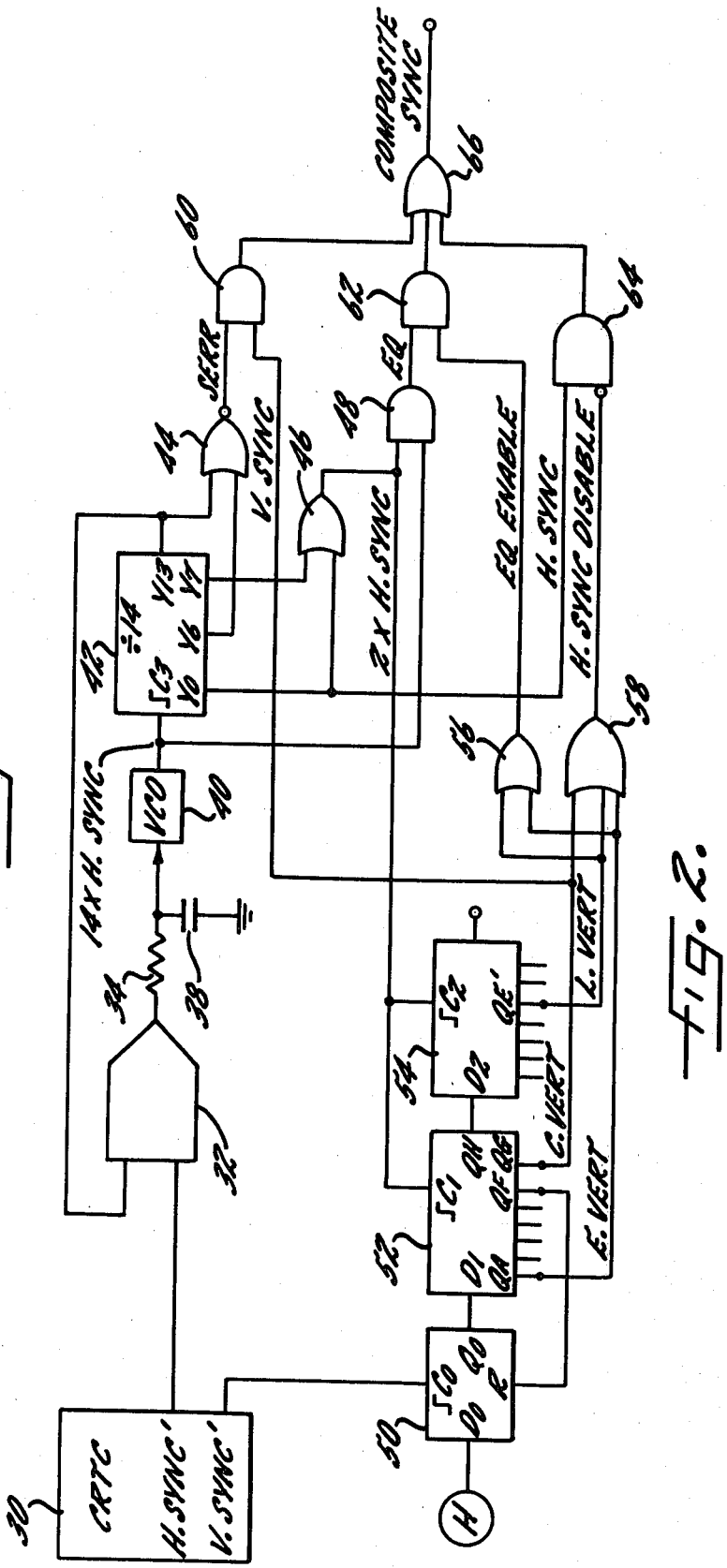
FIG. 2 is a functional schematic diagram of the preferred embodiment of the invention.

As shown in FIG. 2, a horizontal frequency input signal (H. SYNC') and a vertical frequency input signal (V. SYNC') are supplied by a CRTC (30). The steady stream of horizontal sync pulses (H. SYNC) is derived from the horizontal frequency input signal (H. SYNC') by a phase-locked loop including an edge-sensitive phase detector (32), low-pass filter including a resistor (34) and capacitor (38), a voltage-controlled variable frequency oscillator (VCO), (40), having a frequency range including fourteen times the frequency of the horizontal frequency input signal (H. SYNC'), and a digital divider dividing the variable frequency oscillator (VCO) output by fourteen to generate four divider phases $(Y_0)$, $(Y_6)$, $(Y_7)$, $(Y_{13})$. One of the phases $(Y_{13})$ is fed back to the phase detector (32) so that the variable-frequency oscillator (40) phase-locks to fourteen times the frequency of the horizontal frequency input signal (H. SYNC') and a steady stream of horizontal sync pulses (H. SYNC) phase-locked to the horizontal frequency input signal (H. SYNC') is obtained from one of the divider phases $(Y_0)$.

Figure 3:
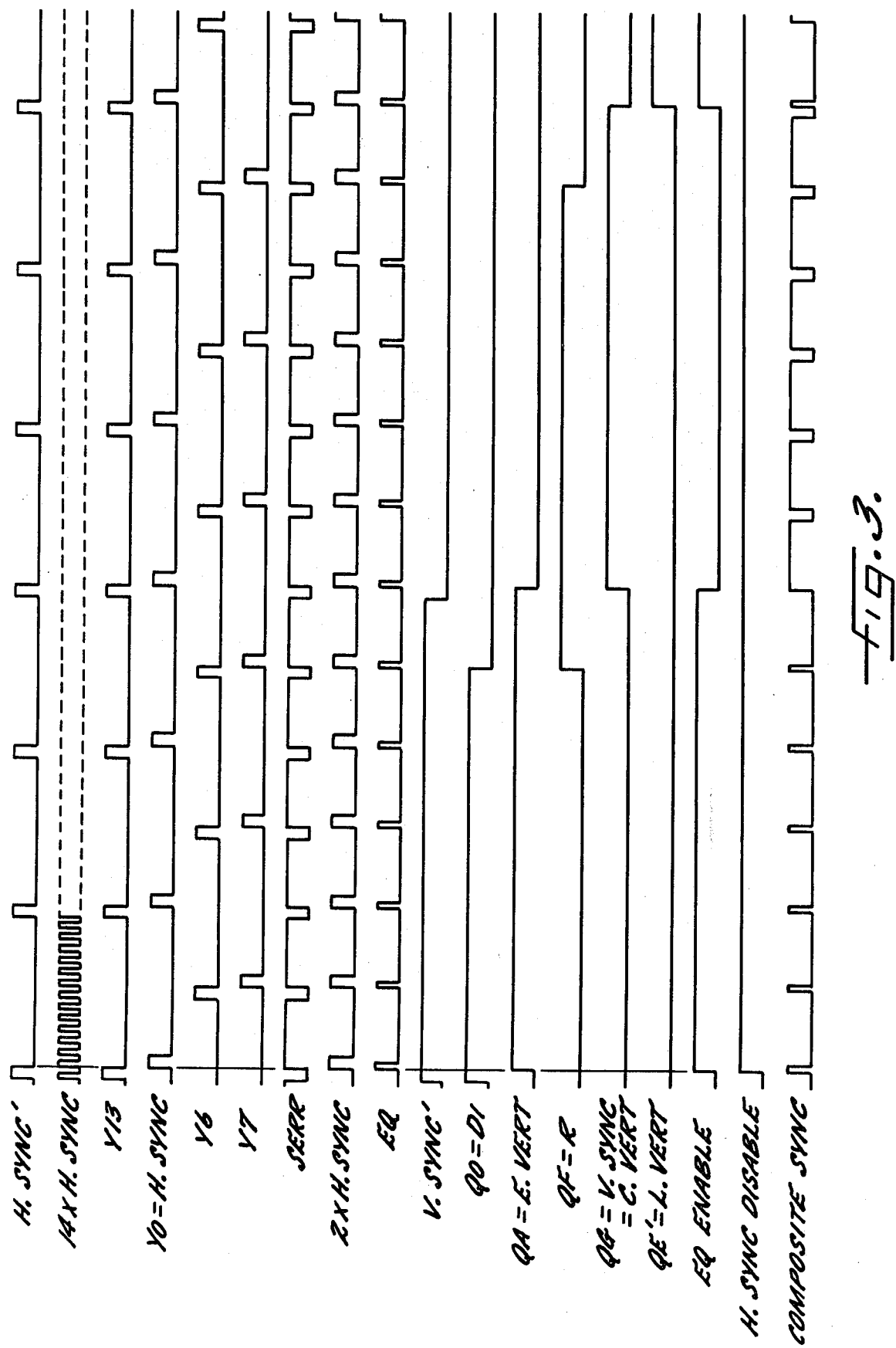
FIG. 3 is a detailed timing diagram corresponding to the functional schematic of FIG. 2.

As more specifically illustrated in the timing diagram of FIG. 3, the digital divider (42) generates a phase $(Y_7)$ 180 degrees, or opposing the phase $(Y_0)$ of the steady stream of horizontal sync pulses (H. SYNC). The digital divider (42) also generates two opposing phases $(Y_{13})$, $(Y_6)$ that immediately precede the former two phases $(Y_0)$, $(Y_7)$ and when combined by a logical NOR function (44) generate a gating signal (SERR) which serrates the steady stream of vertical sync pulses (V. SYNC). Similarly, the former two phases $(Y_0)$, $(Y_7)$ are logically combined by a logical OR function (46) to generate a signal at twice the horizontal frequency (2×H. SYNC). This signal (2×H. SYNC) is gated by a logical AND function (48) using the variable frequency oscillator (VCO), (40) output (14×H. SYNC) as an enabling signal to reduce the pulse-width by one half and generate a steady stream of narrow equalization pulses (EQ). Note that the digital divider phases $(Y_{13})$, $(Y_6)$ generating the serrating gating signal (SERR) immediately precede the digital divider phases $(Y_0)$, $(Y_7)$ generating the equalizing pulses (H. SYNC) so that all of the leading edges in the NTSC video sync signal (COMPOSITE SYNC) are in phase synchronism. This requirement of the NTSC standard insures that the TV monitor used can easily track the horizontal frequency even when the vertical sync pulses are included in the NTSC video sync signal (COMPOSITE SYNC).

The signals containing the vertical timing information (V. SYNC), (EQ ENABLE), (H. SYNC DISABLE) are derived from stages (QA), (QG), (QE), of a shift register digital delay line including eight-bit shift registers (52), (54) which delay the vertical frequency input signal (V. SYNC') from the CRTC (30). The vertical timing information (V. SYNC), (EQ ENABLE), (H. SYNC DISABLE) is resynchronized and the vertical sync pulse (V. SYNC) width set to exactly three horizontal periods by processing the vertical frequency input signal by a flip-flop (50) wich is set by the information-containing leading edge of the vertical frequency input signal (V. SYNC'), and after passing its output $(Q_0)$ to the input $(D_1)$ of the first eight bit register (52), is reset via a reset input (R) three horizontal periods later by the output of the sixth stage (QF). The shift registers (52), (54) are clocked by applying twice the horizontal frequency (2×H. SYNC) to the shift register clock inputs (C1, C2) that initiate shifting between stages upon the indicated rising edge (↗) of the clock input signal; thus two stages correspond to a delay of one horizontal period. As shown, the edge-sensitive flip-flop (50) function is performed by using a D type flip-flop with the data input $(D_0)$ tied to a logical 1, or logical "high" (H).

Early, current, and late versions of the series of vertical sync pulses (E. VERT), (C. VERT) and (L. VERT) respectively, are obtained from three shift register stages (QA), (QG) and (QE') respectively. The series of vertical sync pulses (V. SYNC) is obtained directly from the current version (C. VERT). The gating signal for the equalization pulses (EQ ENABLE) is obtained by the logical OR (56) of the early (E. VERT) and late (L. VERT) versions of the vertical sync pulses. The gating signal for the horizontal sync pulses is obtained by the logical OR (58) of the early (E. VERT), current (C. VERT) and late (L. VERT) versions.

The NTSC standard vertical sync signal (COMPOSITE SYNC) is obtained by the logical sum of products of the serration (SERR) and vertical sync (V. SYNC) via a logical AND (60); the equalization pulse stream (EQ) and the equalization gating signal (EQ ENABLE) via a logical AND (62); and the horizontal sync pulse stream (H. SYNC) and the complement of the horizontal sync disable signal (H. SYNC DISABLE) by a complement and logical AND function (64); all of which are logically summed by a logical OR function (66).

It should be noted that the combinational logic functions symbolized as gates (44), (46), (48), (56), (58), (60), (62), (64), (66) in FIG. 2 may be implemented by an infinite variety of equivalent logical combinations. The logical operation, however, is uniquely described by a sum-of-products Boolean equation and once given the logical operation, persons skilled in digital electronics know how to substitute various logic circuitry to perform the equivalent sum-of-products Boolean equation and to derive the characteristic Boolean equation from a given implementation by application of deMorgan's Law and other fundamental mathematical operations of Boolean algebra. A person skilled in the art of digital electronics can, for example, derive the characteristic sum-of-products equation for the logical output (COMPOSITE SYNC) in FIG. 2 as:

$$\begin{aligned}(\text{COMPOSITE SYNC}) = & (\overline{Y_{13}})\,(\overline{Y_6})\,(\text{C. VERT}) + \\ & (Y_0)\,(14 \times \text{H. SYNC})\,(\text{E. VERT}) + \\ & (Y_0)\,(14 \times \text{H. SYNC})\,(\text{L. VERT}) + \\ & (Y_7)\,(14 \times \text{H. SYNC})\,(\text{E. VERT}) + \\ & (Y_7)\,(14 \times \text{H. SYNC})\,(\text{L. VERT}) + \\ & (Y_0)\,(\overline{\text{E. VERT}})\,(\overline{\text{C. VERT}})\,(\overline{\text{L. VERT}})\end{aligned}$$

where
(A) (B) represents the logical AND of A and B
(A)+(B) represents the logical OR of A and B
$\overline{A}$ represents the logical complement of A.

Figure 4:
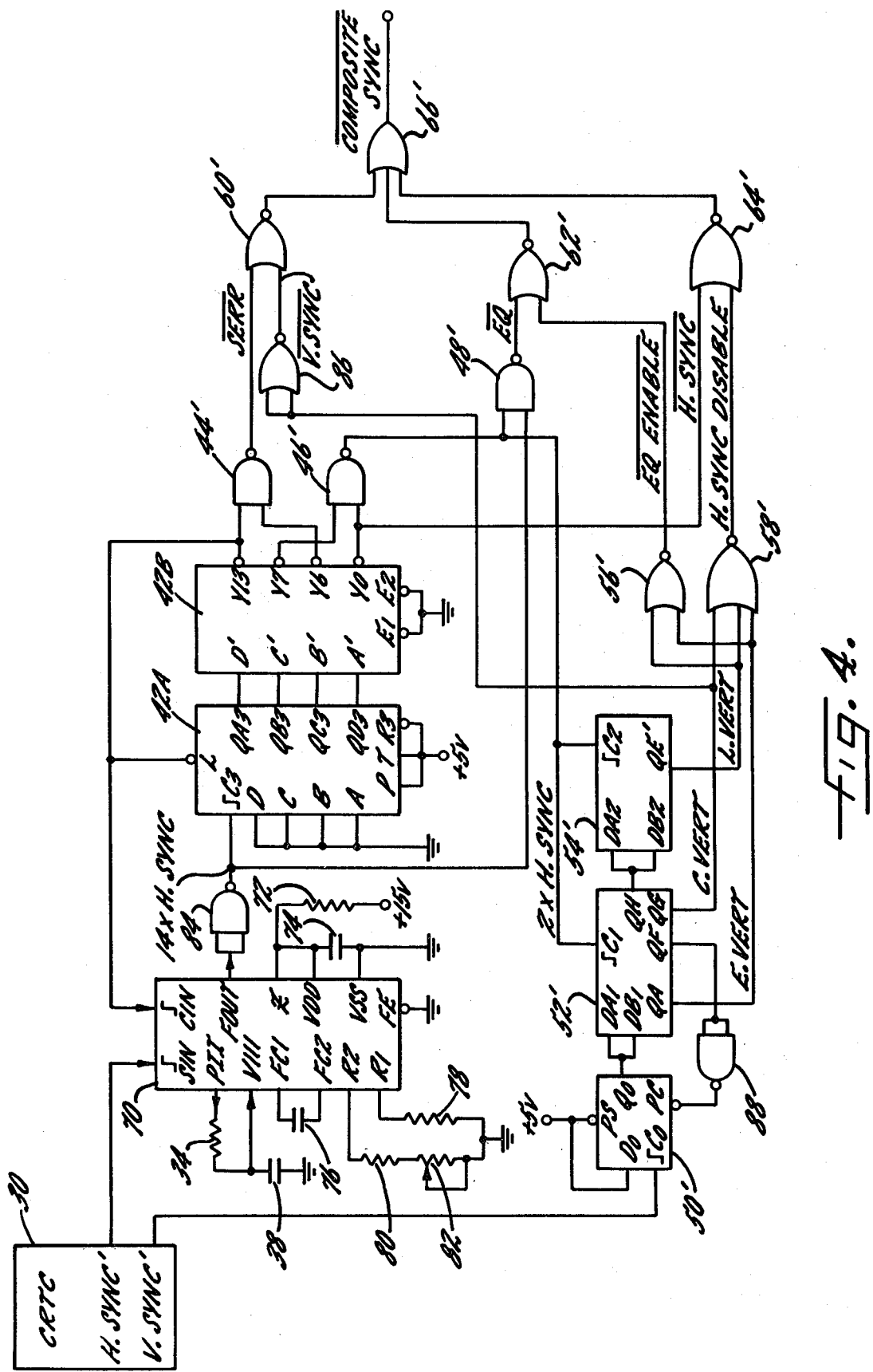
FIG. 4 is a schematic diagram of the preferred embodiment of the invention implemented with conventional logic ICs.

As shown in FIG. 4, the combinatorial logic may be implemented using conventional IC logic packages including NAND gates (44'), (46'), (48') and NOR gates (60'), (56'), (58'), (60'), (62'), (64'), (66') and (86). As further shown in FIG. 4, a CRTC such as a Motorola part No. MC6845 generates the horizontal frequency (H. SYNC') which, according to the best mode of the invention, is fed to the signal input (SIN) of an IC complementary MOS digital PLL manufactured by RCA as CMOS part No. 4046. The phase of the signal input (SIN) is compared to the phase of the reference input (CIN) by an internal edge-sensitive phase detector to generate an output (PII) having a DC value proportional to the phase difference between the signal input (SIN) and reference input (CIN). The 4046 has two phase detectors; the desired edge-sensitive detector output with an output proportional to the absolute phase difference between signal transitions is the output of the "type II" phase detector appearing on pin 13 of the IC package. The phase detector output (PII) is low-pass filtered by a resistor (34) and capacitor (38) to drive the phase error signal fed to the VCO input (VIN). Nominal values are 68K ohms and 0.1 microfarads, respectively. The center frequency of the VCO is set by a capacitor (76) across the capacitance input pins (FC1), (FC2) and by a resistor 78 grounding the "R1" input pin (R1) and resistors (80), (82) grounding the "R2" input pin (R2). Typical component values are 250 picofarads, 12k ohms, 10k ohms, and 10k ohms, respectively. The R1 input pin (R1) is pin 11 and the R2 input pin (R2) is pin 12 on the IC package. The resistance to ground on the input pins (R1), (R2), in conjunction with the capacitance across the VCO capacitance input pins (FC1), (FC2) determines both the center frequency and range within which the PLL may lock onto the horizontal frequency input signal. As shown, a potentiometer is used to set one of the resistance values (82) so that a wide range of horizontal input frequencies may be accommodated. It should be noted that the polarity of the phase detector output (PII) and the polarity of the VCO input (VIN) are inherently set so that the VCO frequency changes to reduce the detected phase error. The VCO frequency is also stabilized by power supply filtering provided by a series dropping resistor (72) from a 15 volt supply (+15 V) to a filtering capacitor (74) shunting the supply (VDD) and ground (VSS) pins of the IC package. Typical component values are 1.5K ohm and 0.22 microfarads, respectively. The supply pin (VDD) is also connected to an internal zener reference via a pin (Z) on the IC package. The VCO enable input (FE) is also grounded to activate the VCO.

The VCO output, running at approximately fourteen times the horizontal input frequency, appears on an output pin (FOUT) and is buffered by a NAND gate (84) wired as an inverter to generate a high-speed logic signal with fast rise times (14×H. SYNC). This high-speed signal is fed to the clock input (C3) of a TTL synchronous counter (42A), which is a part No. 74LS163 as shown in FIG. 4. The binary counter outputs (QA3), (QB3), (QC3), (QD3) are fed to the inputs (A'), (B'), (C'), (D') of a 4 to 16 line decoder (42B) TTL part No. 74LS154 to provide individual outputs indicating each individual state of the synchronous counter. The enable (P), (T) and reset (R) inputs are tied to the logic supply (+5 v) to activate the synchronous counter (42A); similarly the enable inputs (E1), (E2) of the decoder (42B) are set to ground. The state 13 output (Y$_{13}$) of the decoder (42B) is fed back to the parallel load input (L) of the synchronous counter (42A) and the parallel inputs (A'), (B'), (C'), (D') of the synchronous counter (42A) are set to ground so that the synchronous counter is reset to state 0 after state 13. In other words, the counter and decoder divides the buffered VCO signal (14×H. SYNC) by 14 so that the horizontal frequency appears on the decoder (42B) outputs, and each output provides a distinct phase. One output (Y$_{13}$) is fed back to the reference input (CIN) of the IC PLL (70) so that its phase is locked to the phase of the horizontal input frequency (H. SYNC').

The vertical frequency input signal (V. SYNC') from the CRTC (30) is fed to the clock input (C$_0$) of a TTL D flip-flop (50'), part No. 74LS174. The D input (D$_0$) and preset input (PS) are wired to the logic supply (+5 v). Thus the D flip-flop functions as an edge-sensitive set flip-flop with an asynchronous reset on the preclear pin (PC). The flip-flop output (Q$_0$) is fed to the serial inputs (DA1), (DA2) of a TTL 8 bit shift register (52'), part No. 74LS164. The last stage output Q$_H$) is fed to the serial inputs (DA2, DB2) of a similar 8 bit shift register (54'). The sixth stage output (QF) of the combined 16 stage register (52', 54') is inverted by a NAND gate (88) wired as an inverter and fed to the preclear input (PC) of the D flip-flop (50'). Thus the D flip-flop (50') is triggered by a rising edge ( ) on the vertical frequency input signal (V. SYNC') and reset after 6 shifts through the shift register (52'). The clock inputs (C$_1$), (C$_2$) of the combined 16 bit shift register (52', 54') are both wired to the output of the NAND gate (46') generating the clocking signal (2×H. SYNC) at twice the horizontal frequency. Thus a vertical sync pulse exactly three horizontal periods long propagates through the combined shift register (52', 54'). Early (E. VERT), current (C. VERT), and late (L. VERT) regenerated versions of the vertical sync pulse are obtained at shift register stage outputs (QA), (QF) and (QE'), respectively.

Note that the D flip-flop (50') may be triggered by a rising edge (↑) on the vertical frequency input signal (V. SNYC') any time between two given rising edges (↑) on the clocking signal (2×H. SYNC) without affecting the output signals of the combined shift register (52', 54') and thus small, random fluctuations in phase between the clocking signal (2×H. SYNC) and the vertical frequency input signal (V. SYNC') are entirely suppressed. These random functions are caused predominately by the tracking error of the PLL (70), (84), (42A), (42B) since the CRTC (30) generates vertical synchronization frequency (V. SYNC') pulses synchronized to horizontal frequency (H. SYNC') pulses as shown in FIG. 3. The combined shift register (52', 54') alone guarantees phase synchronism and the D flip-flop (50') in conjunction with the shift register (52', 54') assures that the regenerated vertical sync pulses (E. VERT, C. VERT, L. VERT) are exactly three horizontal periods long regardless of the pulse width of the vertical frequency input signal (V. SYNC'). Similarly, the PLL IC (70) phase detector is responsive only to the rising edge (↑) of the horizontal frequency input signal (H. SYNC') and thus is unaffected by the pulse width of the horizontal frequency input signal (H. SYNC'). Thus the preferred embodiment of FIG. 4 is extremely flexible in accepting input signals.

Combinatorial logic including logic gates (44'), (46'), (48'), (56'), (58'), (86), (60'), (62'), (64'), and (66') generate the logical complement of the NTSC video sync signal ($\overline{\text{COMPOSITE SYNC}}$) at the output of NOR gate (66') from the shift register stage outputs (QA), (QF), (QE), the decoder phase outputs ($Y_0$), ($Y_6$), ($Y_1$), ($Y_{13}$), and the buffered VCO output (14×H. SYNC).

What is claimed is:

1. A circuit for accepting a horizontal frequency input signal and a vertical frequency input signal and generating a combined video synchronization signal, comprising, in combination:
   (a) a phase-locking means having an input accepting the horizontal frequency input signal for generating a plurality of phases at the horizontal input frequency;
   (b) delay means for receiving the vertical input frequency and having outputs providing consecutive early, current, and late vertical sync pulses; and
   (c) a combinatorial logic means, having combinatorial logic gates with inputs accepting a plurality of the phases at the horizontal input frequency and the consecutive early, current, and late vertical sync pulses, for generating a composite video synchronization signal having both the horizontal and the vertical synchronization frequencies, and having only one phase of the horizontal input frequency in the absence of the consecutive early, current, and late vertical sync pulses, and having at least two phases of the horizontal input frequency during the consecutive early and late vertical sync pulses, so that a composite video synchronization signal is generated having horizontal pulses, serrated vertical pulses, and equalization pulses at twice the horizontal frequency preceding and following the serrated vertical pulses.

2. The circuit as claimed in claim 1, wherein the combinatorial logic means includes a combinatorial logic circuit having a logic output and comprising:

(a) a first gating means for passing one phase of the digital divider in the absence of the current, early, and late vertical sync pulses so that horizontal sync pulses are provided at the output;
(b) a second gating means for passing the current vertical sync pulse in the absence of two opposing phases of the digital divider so that serrated vertical sync pulses are provided at the logic output;
(c) means for narrowing two opposing phases of the digital divider so that narrow equalization pulses are provided; and
(d) a third gating means for passing the two narrowed opposing phases of the digital divider upon the occurrence of the early vertical sync pulse and the late vertical sync pulse, so that a composite video synchronization signal is generated at the logic output having horizontal sync pulses at the horizontal input frequency and serrated vertical sync pulses at the vertical input frequency, and narrow equalization pulses preceding and following the serrated vertical sync pulses, with the serration rate and equalization pulse rate at twice the horizontal input frequency.

3. The circuit as claimed in claim 2, wherein the phase-locking means includes a phase-locked loop comprising:
   (a) a variable-frequency oscillator generating a signal at approximately a multiple of the horizontal input frequency and having a frequency control input;
   (b) a digital divider clocked by the variable frequency oscillator and generating a plurality of phases at approximately the horizontal input frequency; and
   (c) a phase comparator accepting the horizontal input frequency and a phase of the digital divider and generating a phase error signal, fed to the variable frequency oscillator frequency control input, responsive to the difference in phase between the horizontal input frequency and the digital divider phase and having a polarity tending to change the variable frequency oscillator frequency to reduce the phase error signal so that the digital divider phases are phase-locked to the horizontal input frequency.

4. The circuit as claimed in claim 3, wherein the delay means includes a shift register clocked with at least one phase of the digital divider, so that the early, current, and late vertical sync pulses are in phase synchronism with the horizontal sync pulses despite random fluctuations in the phase tracking error of the phase-locked loop.

5. The circuit as claimed in claim 4, wherein the delay means further comprises a flip-flop having an edge-sensitive set input receiving the vertical frequency input signal, a reset input, and an output connected to the serial input of the shift register, the shift register having at least thirteen stages and clocked by two opposing phases of the digital divider, one of which is the phase generating the horizontal sync pulses, and having the sixth stage output fed back to the flip-flop reset input, so that sequential early, current, and late vertical sync pulses of three horizontal frequency periods duration are generated at the first, seventh, and thirteenth stage outputs, respectively.

6. The circuit as claimed in claim 3, wherein the digital divider has at least four phases and the two phases serrating the current vertical sync pulse immediately precede the two phases generating the equalization pulses, and one of the phases generating the equalization pulses is also the phase generating the horizontal sync pulses, so that the leading edges of the equalization pulses are in phase synchronism with the leading edges of the horizontal sync pulses and the trailing edges of the serration pulses, at twice the horizontal frequency.

7. The circuit as claimed in claim 6, wherein the digital divider has a division ratio of fourteen, and the combinatorial logic circuit includes gating means for generating the narrow equalization pulses enabled by the variable-frequency oscillator signal, so that the horizontal sync and serration pulse width is the one-fourteenth the horizontal frequency input period and the equalization pulse width is one-half the horizontal sync pulse width.

8. The circuit as claimed in claim 7, wherein the combinatorial logic circuit has the characteristic Boolean equation in sum of product form OUTPUT=- (Y(n+13)) (Y(n+6)) (C. VERT)+(Y(n+0)) (14×H. SYNC) (E. VERT)+(Y(n+0)) (14×H. SYNC) (L. VERT)+(Y(n+7)) (14×H. SYNC) (E. VERT)-+(Y(n+7)) (14×H. SYNC) (L. VERT)+(Y(n+0)) (E. VERT) (C. VERT) (L. VERT), in which OUTPUT denotes the binary value of the logic output, Y(m) denotes the binary value of the mth phase, modulo 14, of the digital divider; n is any integer; E. VERT, C. VERT and L. VERT denote the binary value of the early, current, and late vertical sync pulses, respectively; and 14×H. SYNC represents the binary value of the variable frequency oscillator signal clocking the digital divider; A represents the binary complement of A, (A)(B) represents the binary product, or AND, of A and B, and A+B represents the binary sum, or OR, of binary variables A and B, so that a video synchronization signal is generated at the logic output conforming to National Television Standards Committee specifications.

9. The circuit as claimed in claim 8, wherein the digital divider includes a binary counter of at least four binary stages having a clock input receiving the variable frequency oscillator frequency and having a reset input and a binary decoder having an input accepting the binary counter stage outputs and having individual outputs indicating individual binary states, one of which is connected to the binary counter reset input, and which also provide the plurality of phases at the horizontal frequency.

* * * * *